Figure 8:
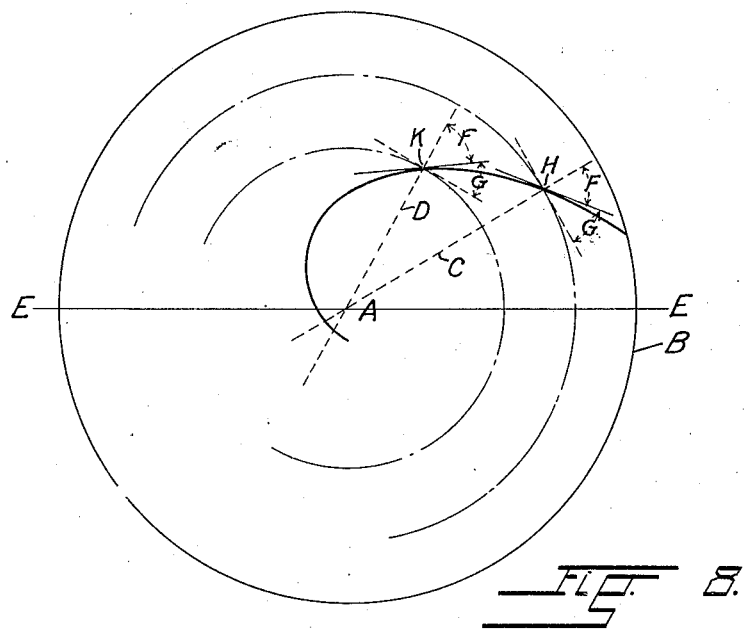

Nov. 3, 1931.    C. W. KURIE, JR., ET AL    1,830,515
THICKENER
Filed Dec. 12, 1927    3 Sheets-Sheet 1
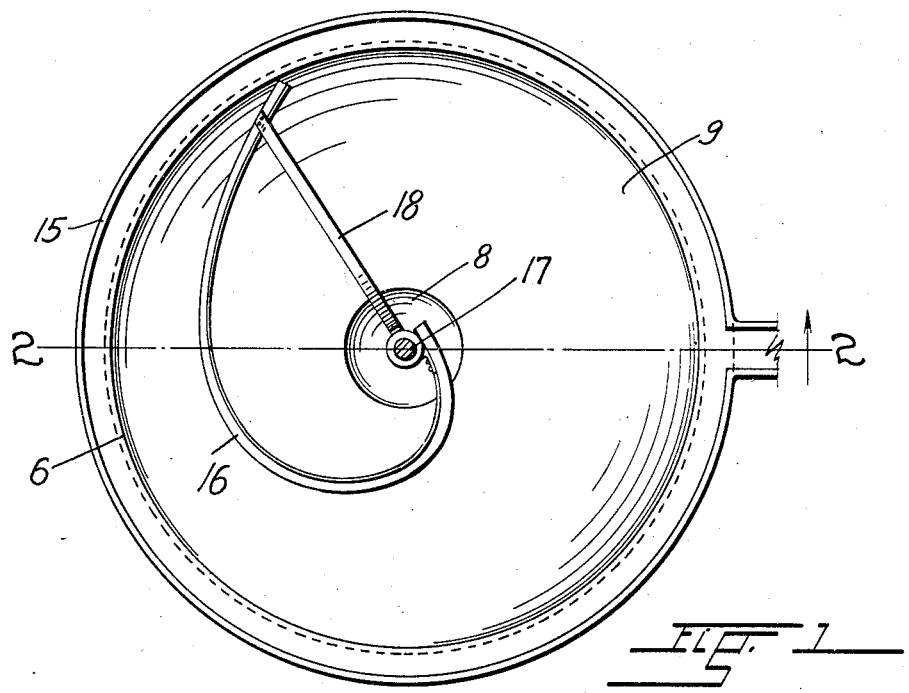
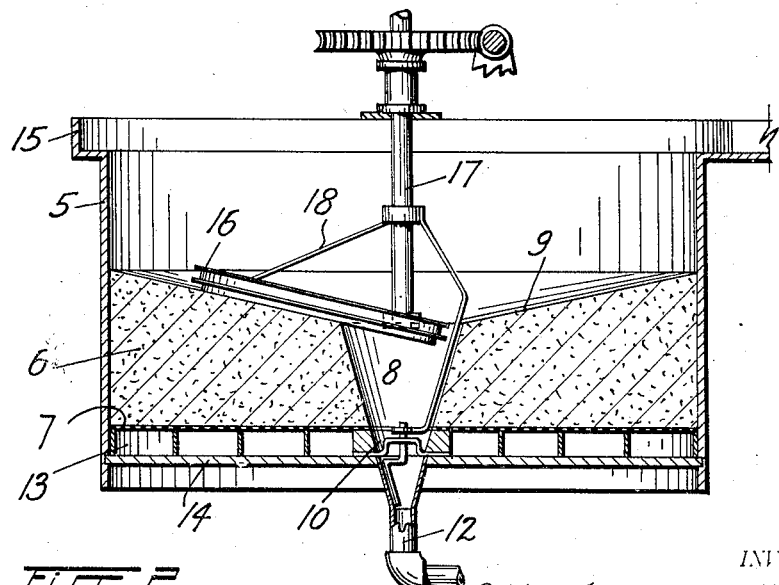
INVENTOR.
C. W. Ankeny and C. W. Kurie Jr.
BY
ATTORNEY.

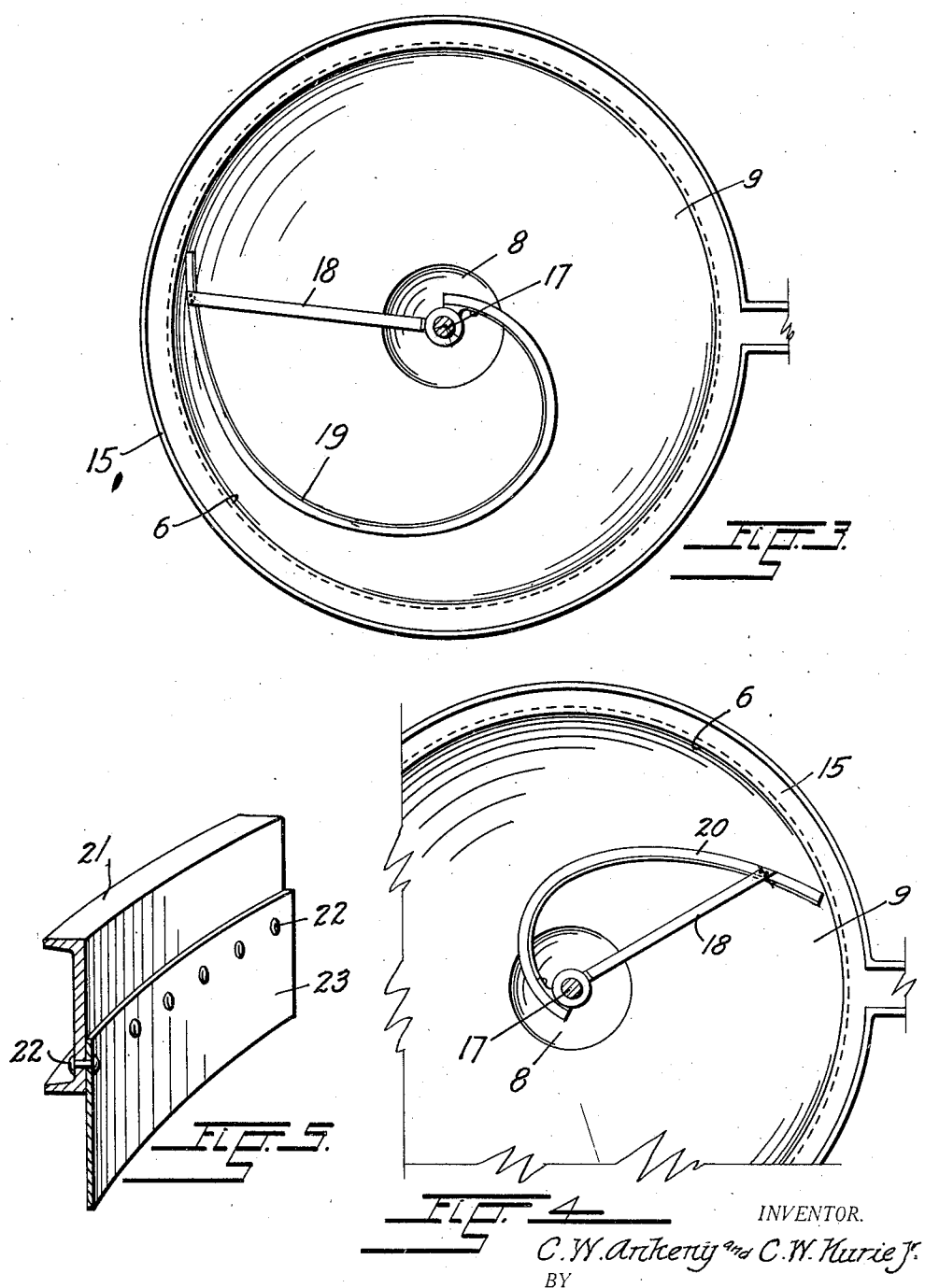

INVENTORS
C. W. Ankeny and C. W. Kurie Jr.
BY
ATTORNEY.

Patented Nov. 3, 1931

1,830,515

UNITED STATES PATENT OFFICE

CHARLES W. KURIE, JR., AND CLEMENT W. ANKENY, OF COLORADO SPRINGS, COLORADO, ASSIGNORS TO THE CYCLE COMPANY, OF COLORADO SPRINGS, COLORADO, A CORPORATION OF COLORADO

THICKENER

Application filed December 12, 1927. Serial No. 239,578.

This invention relates to apparatus requiring the function of a scraping element for moving matter to a point of discharge in the treatment of ores and other materials.

The invention is particularly adapted for use in association with thickeners, filters and clarifiers employed for the separation of solids out of liquid suspensions and it has been shown in the accompanying drawings and will hereinafter be described in connection with a thickener and clarifier of the Coe-Bloomfield type.

In apparatus of this character, settled solids together with or without the upper strata of a filter bed are moved to a central point of discharge by a scraping element having a rotary movement about an axis central of the bed and its discharge opening, and the present invention relates particularly to scraping elements of that kind.

The invention is based upon discoveries supplemented by carefully conducted experimentations and calculations and its primary object is to provide in combination with a surface upon which solids settle in the treatment of various materials, a rotary scraper which is capable of advancing any deposit or accumulation of materials, resulting from settling, filtering, thickening or chemical precipitation, to a predetermined point of discharge or recovery in a continuous movement and without allowing any of the material to come to rest after having once been set in motion.

Another object of the invention is to provide a scraping or cutting element of the above described character which in its operation prevents the accumulation or building up of material at any point of the surface over which it moves and which therefore provides for a continuous and even discharge of material subject to a continuous and even feed.

The principles upon which the invention is based are:

First, that in order to attain any or all of the above stated objects, the scraper must be in the form of a spiral of continuous curvature i. e. without any parts, points or regions that may permit the material to come to or approach a condition of rest at any time during its movement to the point of discharge or recovery.

Second, that this result is best attained by a methodical mathematical curve of a determined angle ratio throughout its length and of other specific characteristics.

Third, that a scraper made on this theory, in order to satisfy different requirements in the treatment of variant substances, must be capable of variation with respect to its angularity or angle ratio.

Fourth, that this angle ratio may be such as to provide one of the following spirals.

*a.* A spiral having a constant scraping angle at any point of its curve.

*b.* A spiral whose scraping angle decreases progressively from its outer or free end toward the axis of rotation.

*c.* A spiral whose scraping angle increases gradually from its outer extremity to its center of rotation, and

*d.* A spiral whose curvature combines any two or more of the characteristics named hereinbefore.

The constant angle curve described under (*a*), which may be designated as an archimedian curve gives a constant scraping angle throughout the length of the spiral, it moves the material at an angle which is uniformly constant at any point of the surface, and is preferred under ordinary conditions since it removes the material with little agitation and high rapidity. An advantage of the constant angle curve under ordinary conditions is based on the propensity of a large percentage of materials to slide or scour freely at one angle and to stick, jam or clog at other angles.

The curve of decreasing scraping angle mentioned under (*b*), which may be differentiated from the other as a logarithmic spiral, is particularly adapted for use in the treatment of comparatively dry materials. The spiral impels the material over a path of greater length than the constant angle spiral but the additional time and distance travelled before discharge, promotes both drying and settling.

Another advantage of this spiral is that the decreased scraping angle near the center of rotation compensates for the decrease of moisture in the material as it approaches the center. The scraper removes the material at a lower velocity, and its more acute scraping angle is more favorable for scour and slip, compensating for reduction in speed of the material as it approaches the center.

The curve of increasing scraping angle defined under (c) which may be described by the equation $$p = a\theta\frac{1}{n}$$

provides a spiral particularly adapted for the removal of material that slips or scours readily. In this formula $p$ represents a point in the curve of the scraper; $a$ represents the radial distance of this point from the center of rotation; $\theta$ represents the vector angle and 1 over $n$ represents the $n$th root. In Figure 8 there is shown a method by which the locus of such point may be established and thus the curve drawn. In this figure it will be obvious that the point $p$ may be represented by a point on the curve as H, the vector angle for this point is EAH and the radial distance is AH. In the curve here shown $n$ has been given a value of 3. Thus the formula is a polar coordinate formula and it will be apparent that under the conditions in which $n$ equals 3 the rate of change of the radius vector or length AH will be equal to three times the square of the vector angle EAH as this angle increases. It will be noted that, as the rate of change of the radius vector increases as its length becomes less, the scraping angle, indicated in Figure 8 at G, increases. The greater scraping angle near the center of rotation allows rapid removal of material, thereby relieving congestion near the center and allowing greater capacity with less material in construction.

A spiral of compounded curvature, referred to under (d), may be employed in the treatment of many materials which do not respond as readily to the action of the other curves.

Additional to the above stated characteristics that distinguish a scraping element according to the present invention from others used or proposed for use heretofore, are First, the construction of a scraper having a readily removable and renewable cutting or scraping section, and having a working part of thin tough material that reduces the possibility of the scraper sliding over the surface instead of scraping or cutting and that prolongs the life of the cutting edge.

Second, the production of a spiral scraper of more than common depth, which permits of the material piling up against the scraper during movement thereof and being retained subject to its discharge. This is of particular advantage in case of heavy settlement when a large amount of material must be removed in a given time, it being apparent that particularly in a spiral of constant scraping angle, velocity of material along the blade decreases as the material approaches the central point of discharge.

Moreover, the central portion of the scraper must necessarily handle all of the material propelled by the outer portions, resulting in a tendency toward piling up of the material as it nears the center. To provide for this condition, the height of the scraper may be gradually increased from its outer end inwardly.

Third, the provision of a single methodical or mathematical curve, for rotation about the center of a settling surface, without the assistance of other scrapers as are frequently employed in apparatus at present in use. The methodical curvature of the spiral permits of its handling all the material by a constant uninterrupted movement and avoids interference resulting from the employment of a plurality of scrapers following one another in their rotary movement about a common center. A reason for this is that two scrapers cannot be made to follow the same track or even nearly so, and will leave openings above the surface through which the heavy mud may ooze into the path of the following scraper, whose movement is thus obstructed.

It is obvious that such obstruction affects the operation of the entire scraping element and that a scraper like that of the present invention that can singly handle all of the material is a decided and valuable improvement.

Fourth, the combination of a spiral of the methodical mathematical curvature hereinbefore described, with a sloping bottom, lltering or settling surface. The slope of the surface affects the action of the spiral scraper so as to either retard or assist the movement of the material to the point of discharge.

If the surface slopes toward the discharge opening, the movement of the material is accelerated or if it slopes away from the opening, the movement is retarded thereby allowing for additional drainage and drying of the material under treatment.

A spiral scraper of continuous curvature such as hereinabove described, operating in conjunction with a sloping surface, has the property of being able to move all of the material to be handled, continuously and uniformly, and is of a particular advantage in that it lowers agitation in the lower settling zones and produces a cleaner settling or filtering surface.

The capacity of the machine is also increased since the continuous curve of the spiral and the slope of the surface cooperate to produce a continuous movement of the material from the time it is picked up by the scraper until it is discharged.

Figures 6, 7:
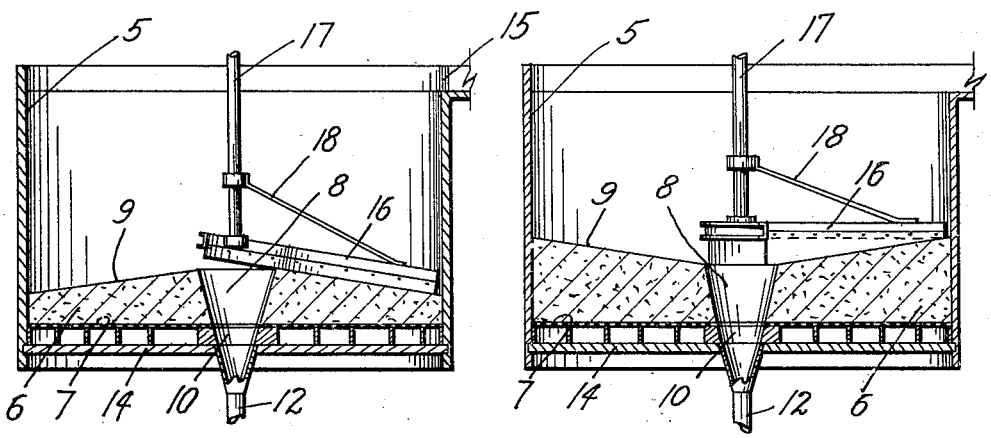

An embodiment of the invention has been illustrated in the accompanying drawings in the several views of which like parts have been similarly designated and in which Figure 1 represents a plan view of a filter and clarifier equipped with a scraper according to the present invention, the scraper shown being in the form of a constant angle spiral, Figure 2, a vertical section taken on the line 2—2, Figure 1, Figure 3, a view similar to Figure 1, showing a spiral scraper in which the scraping angle is gradually decreased from the periphery of the tank to the central point of discharge, coincident with the axis of rotation, Figure 4, a plan view of the machine, partially broken, illustrating a spiral scraper having a decreasing scraping angle toward the central point of discharge, Figure 5, a perspective view of either of the scrapers shown in Figures 1, 3 and 4, illustrating a preferred method of construction, Figure 6, a vertical section similar to Figure 2, of a filter in which the upper surface of the filter bed slopes from the central point of discharge to the periphery of the tank, Figure 7, a similar view in which the surface slopes in the opposite direction or toward the discharge opening, also showing a modification in the form of the spiral scraper, and Figure 8, a diagrammatic view showing the method of measuring or designating the angles of the spiral and of plotting the spirals according to mathematical equations.

Figure 8 is intended to be explanatory of the terms used in this description.

Premising that the point A is the center of the filter bed, coincident with the axis of rotation of the scraper and the point of discharge, and the circle B is a circumference of the same, vector radii C and D have been shown at different angles to a standard line E—E. The "spiral angle", designated by the letter F, is in each instance formed by the tangent to the spiral and the radius, and the "scraping angle" shown at G measures the difference between the ninety degree angle of the radius and the tangent of its circle at the given points H or K, and the spiral angle.

Thus the scraping angle may be described as being the angle between the tangent to the spiral and the tangent to the circle at the point taken, and it is apparent that as the spiral angle increases, the scraping angle decreases and vice versa.

Now referring to Figures 1 and 2 of the drawings, the reference numeral 5 designates a cylindrical tank in which a body or bed 6 of filtering material is supported upon a perforated false bottom 7. The filter bed has a central funnel shaped well 8 through which the solid matter scraped off the surface 9 of the bed, is discharged.

The well connects at its lower end with a passage 10 through the two bottoms of the tank connecting with a delivery conduit 12. The space 13 between the true bottom 14 and the false bottom 7 of the tank receives the liquid after it has percolated through the filter bed, the filtrate being withdrawn from the space by means not shown in the drawings.

The tank has at its upper edge a peripheral launder 15 for the overflow of clear liquid.

The construction so far described is per se not a part of the present invention it being apparent that the scraper may be applied to other machines of similar character, such as thickeners for example, in which a rotary element moves material across a settling surface to a point of discharge.

In this connection it is to be observed that while the discharge opening is preferably in the center of the surface, it may under certain conditions be disposed at the periphery of the same in which case the scraper is arranged to move the material in the opposite direction.

The scraper 16 forming the subject of the present invention is mounted at the lower end of a rotary shaft 17, the axis of which is coincident with that of the filter bed, and it is braced by means of arms 18.

In machines in which it is desirable to remove the upper strata of the filter bed together with the material settled thereon, the scraper may be automatically and periodically lowered but this feature has not been illustrated in the drawings as not being part of the present invention.

The surface of the filter bed as shown in figure 2, slopes from the periphery of the bed toward the central point of discharge. The slope of the surface assists the movement of the material toward the discharge opening, whereas if the direction of the slope is reversed as illustrated in Figure 6, the progress of the material toward the opening by rotary motion of the scraper is retarded, thereby allowing for additional drainage and drying of the material being handled.

The spiral scrapers 19 and 20 shown in Figures 3 and 4 respectively, differ from that illustrated in Figure 1, in the form of their curves, the spiral of the scraper of Figure 1 having a constant scraping angle throughout its length, that of Figure 3 having a scraping angle that increases progressively from the free end of the scraper to the axis of rotation and that of Figure 4 having a scraping angle that gradually decreases toward the point of discharge.

It has been stated hereinbefore that the scrapers may be used selectively in accordance with varying working conditions or different classes of material to be treated and that either two or all three of the different forms may be utilized to form a spiral scraper of composite angles.

The last mentioned form is readily derived from the forms illustrated, and it has not been shown in the drawings. It is to be noted that the scrapers shown in the various views are distinguished by great depth in comparison with their length and the radius of the surface over which they travel. It has been explained hereinbefore that the depth of the scraper is a distinctive feature of the invention inasmuch as it enables the material to build up against the scraper during its progress toward the point of discharge.

It has also been stated that ordinarily the central portion of the scraper handles more material than the outer portion and for this reason it has been found desirable and advantageous to gradually increase the depth of the scraper from its outer end to its delivery end by tapering the scraper from its axis of rotation outwardly as has been illustrated in Figure 7.

The preferred specific construction of the scraper is best shown in Figure 5.

A rigid supporting bar 21 preferably of channel section is fixed on the drive shaft and held in position by the braces, and removably attached to this bar by rivets 22, bolts or other fastening means, is a cutting blade 23 of thin material which will retain its cutting edge for an indefinite period and which may be readily renewed or resharpened.

The thin cutting edge cuts into the material rather than merely sliding over the surface as occurs where the scrapers are made of heavier metal.

Having thus described our invention, the distinctive advantages of the specified curvature of the scraper, of the elimination of a plurality of scrapers, of the provision of a scraper of more than ordinary depth, and of the combination of a spiral scraper with a sloping settling surface will be apparent.

A spiral scraper having a continuous methodically varying curve measured according to mathematical equations performs a function not attainable by spiral scrapers of arbitrary curvature or by sectional scrapers. A scraper thus formed, performs singly to better advantage than two or more scrapers of either similar or different construction.

In combination with a sloping settling surface it has an efficiency fulfilling every requirement and by making the scraper of great depth either throughout its length or gradually toward the point of discharge, its efficiency may be still further increased.

The scraper of constant scraping angle is applicable to those conditions involving materials of great settling rate and solutions containing large quantities of solids, and it is preferred under ordinary normal conditions, the scraper of decreasing angularity furnishes comparatively slow motion, lower agitation and time for additional drying and settling prior to discharge and the scraper whose scraping angle increases toward the point of discharge has the advantage of eliminating congestion at the point of discharge.

The scraper of continuous curvature removes settled matter in one continuous sweep, keeping the material when once set in motion from coming to rest until it reaches the point of discharge. This prevents the subsidence and spreading of material and fouling of the surface and lower settling zones besides increasing the efficiency and capacity of the machine to a material extent.

An additional advantage of scrapers of mathematical curve resides in that they avoid the use of templates and simplifies recording for future reference.

Having thus described our invention, what we claim and desire to secure by Letters Patent is:—

1. In apparatus of the kind described, a scraper revolving about an axis adjacent one end of the scraper, said scraper being curved in a plane parallel to the surface to be scraped in a logarithmic spiral.

2. An apparatus of the kind described, having a settling surface sloping to a point of discharge, a rotary scraper for moving material towards said point of discharge, said scraper being curved in the surface of rotation to form a regular mathematical curve, the latter being the arc of a logarithmic spiral.

3. In apparatus of the kind described, a scraper rotatable about an axis and inclined to said axis whereby the surface swept by the scraper is conical in form, said scraper being curved in the surface of rotation to form a regular mathematical curve, the latter being the arc of a logarithmic spiral.

In testimony whereof we have affixed our signatures.

CHARLES W. KURIE, Jr.
CLEMENT W. ANKENY.